US010365650B2

(12) United States Patent
Rust

(10) Patent No.: US 10,365,650 B2
(45) Date of Patent: Jul. 30, 2019

(54) METHODS AND SYSTEMS FOR MOVING OBJECT VELOCITY DETERMINATION

(71) Applicant: GM GLOBAL TECHNOLOGY OPERATIONS LLC, Detroit, MI (US)

(72) Inventor: Ian Rust, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 15/605,400

(22) Filed: May 25, 2017

(65) Prior Publication Data

US 2018/0341263 A1    Nov. 29, 2018

(51) Int. Cl.

| | | |
|---|---|---|
| G01C 22/00 | (2006.01) | |
| G05D 1/00 | (2006.01) | |
| G05D 1/02 | (2006.01) | |
| G01P 3/36 | (2006.01) | |
| G01S 17/58 | (2006.01) | |
| G01S 13/58 | (2006.01) | |
| B60W 30/14 | (2006.01) | |
| G01S 17/02 | (2006.01) | |
| G01S 17/89 | (2006.01) | |
| G01S 7/295 | (2006.01) | |
| G01S 13/74 | (2006.01) | |

(Continued)

(52) U.S. Cl.
CPC .......... *G05D 1/0212* (2013.01); *B60W 30/14* (2013.01); *G01P 3/36* (2013.01); *G01S 7/2955* (2013.01); *G01S 13/58* (2013.01); *G01S 13/74* (2013.01); *G01S 13/865* (2013.01); *G01S 13/867* (2013.01); *G01S 13/874* (2013.01); *G01S 13/89* (2013.01); *G01S 17/023* (2013.01); *G01S 17/58* (2013.01); *G01S 17/89* (2013.01); *G05D 1/0231* (2013.01); *G05D 1/0257* (2013.01); *G05D 1/0272* (2013.01); *G06T 7/20* (2013.01); *G01S 2013/935* (2013.01); *G01S 2013/936* (2013.01); *G01S 2013/9321* (2013.01); *G01S 2013/9342* (2013.01); *G01S 2013/9346* (2013.01); *G01S 2013/9353* (2013.01); *G01S 2013/9367* (2013.01); *G05D 1/0088* (2013.01)

(58) Field of Classification Search
None
See application file for complete search history.

(56) References Cited

U.S. PATENT DOCUMENTS 8,886,387 B1 * 11/2014 Agarwal ............... G05D 1/0253
  701/28
8,989,944 B1 *  3/2015 Agarwal ................. G01S 13/87
  340/425.5

(Continued)

*Primary Examiner* — Bhavesh V Amin
(74) *Attorney, Agent, or Firm* — Lorenz & Kopf, LLP

(57) ABSTRACT

Systems and method are provided for controlling an autonomous vehicle. The systems and methods obtain first and second time spaced point clouds based on three-dimensional position data, of a scene outside of the autonomous vehicle, from sensor of the autonomous vehicle. The systems and methods position align a static aspect of the scene in the first point cloud with a static aspect of the scene in the second point cloud to obtain position aligned first and second point clouds. The systems and methods determine, via a processor, a velocity of a moving object in the position aligned first and second point clouds. The systems and methods perform an autonomous vehicle control function using the velocity of the moving object.

18 Claims, 5 Drawing Sheets

(51) Int. Cl.
  *G01S 13/86*   (2006.01)
  *G01S 13/87*   (2006.01)
  *G01S 13/89*   (2006.01)
  *G06T 7/20*    (2017.01)
  *G01S 13/93*   (2006.01)

(56) References Cited

U.S. PATENT DOCUMENTS

| | | | | |
|---|---|---|---|---|
| 9,043,069 | B1* | 5/2015 | Ferguson | B60W 30/00 |
| | | | | 701/23 |
| 9,383,753 | B1* | 7/2016 | Templeton | G05D 1/0246 |
| 9,892,328 | B2* | 2/2018 | Stein | G06T 7/40 |
| 2010/0303341 | A1* | 12/2010 | Hausler | A61B 5/0062 |
| | | | | 382/154 |
| 2014/0022248 | A1* | 1/2014 | Kuffner, Jr. | G06T 17/20 |
| | | | | 345/420 |
| 2015/0254499 | A1* | 9/2015 | Pang | G06K 9/00208 |
| | | | | 382/103 |
| 2015/0287229 | A1* | 10/2015 | Sela | G06T 13/40 |
| | | | | 345/419 |
| 2015/0371815 | A1* | 12/2015 | Potocek | G02B 21/0048 |
| | | | | 250/307 |
| 2016/0321838 | A1* | 11/2016 | Barone | H04N 1/00827 |
| 2017/0357267 | A1* | 12/2017 | Foster | A01B 79/005 |

* cited by examiner

METHODS AND SYSTEMS FOR MOVING OBJECT VELOCITY DETERMINATION

TECHNICAL FIELD

The present disclosure generally relates to vehicles, and more particularly relates to systems and methods pertaining to determining velocity of moving objects for control of autonomous vehicles.

INTRODUCTION

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable for improved operation of autonomous vehicles, such as processing efficient ways of determining velocity of moving object.

Accordingly, it is desirable to provide systems and methods for determining velocity of moving objects. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling an autonomous vehicle. In one embodiment, a method for performing an autonomous vehicle control function includes obtaining first and second time spaced point clouds based on three-dimensional position data, of a scene outside of the autonomous vehicle, from sensor of the autonomous vehicle. The method includes position aligning, via a processor, a static aspect of the scene in the first point cloud with a static aspect of the scene in the second point cloud to obtain position aligned first and second point clouds. The method includes determining, via a processor, a velocity of a moving object in the position aligned first and second point clouds. The method includes performing, via a processor, an autonomous vehicle control function using the velocity of the moving object.

In embodiments, the determining step includes determining a distance moved for the moving object between the position aligned first and second point clouds. The velocity of the moving object is determined based on the distance moved.

In embodiments, the determining step includes using an elapsed time between the first and second time spaced point clouds to determine the velocity. The first and second point clouds may have a time space defined by a frame rate of the sensor.

In embodiments, the method includes identifying a cluster of data points in the first and second time spaced point clouds corresponding to the moving object. The method may comprise matching an identified cluster of data points in the point cloud with an identified cluster of data points in the second point cloud. The matching step may comprise determine a spatial transformation from a cluster of data points in the first point cloud with a cluster of data points in the second point cloud. The determining step may comprise determining velocity of the object based on a distance moved between matched clusters of data points in the position aligned first and second point clouds. The determining step may derive the distance moved from the spatial transformation.

In embodiments, the method includes segmenting the first and second point clouds into moving and static data points. The position aligning step may use the static data points as the static aspect. The determining step may use the moving data points in the position aligned first and second point clouds to determine the velocity of the object. The above step of identifying a cluster of data points in each of the first and second time spaced point clouds corresponding to a moving object may use the moving data points.

In embodiments, the method includes an iterative closest point calculation to determine a spatial transformation between clusters of moving data points. The spatial transformation allows distance moved for the moving object to be determined, wherein the velocity of the moving object is determined based on the distance moved. In other embodiments, the method includes generating a mesh around data points in the first and second point clouds corresponding to the moving object. The mesh may be arranged around an identified cluster of moving data points according the above described segmentation and identifying steps. The method may comprise determining a spatial transformation the mesh in the first and second position aligned point clouds, thereby allowing distance moved to be determined. The velocity is determined based on the distance moved.

In embodiments, the first and second point clouds correspond to successive frames of the sensor capturing the scene. The obtaining, position aligning and determining steps may be carried out for each set of successive frames of the scene captured by the sensor.

In embodiments, the sensor is a lidar sensor or other range finding sensor such as a radar sensor. The sensor may also be an optical camera.

In another embodiment, a system for performing an autonomous vehicle control function is provided. The system includes a data receiving module configured to receive first and second time spaced point clouds based on three-dimensional position data, of a scene outside of the autonomous vehicle, from a sensor of the autonomous vehicle. A static scene alignment module is configured to position align a static aspect of the scene in the first point cloud with a static aspect of the scene in the second point cloud to obtain position aligned first and second point clouds. A velocity calculation module is configured to calculate a velocity of a moving object in the position aligned first and second point clouds. An autonomous vehicle control system is configured to control a vehicle feature using the velocity of the moving object.

In embodiments, the system includes a static and moving segmentation module configured to identify static and moving data points. The static scene alignment module may be configured to position align static aspects of the first and second point clouds based on the static data points.

In embodiments, the system includes an object matching module configured to match a moving object in the first point cloud with a moving object in the second point cloud. The matching process may derive a spatial transformation between the moving objects, which are represented by clusters of moving data points. The velocity calculation module may be configured to calculate the velocity of the moving object based on the matched moving object in the position aligned first and second point clouds. The object matching module may be configured to identify clusters of moving data points to identify a moving object. The moving data points may be identified as moving by the segmentation module described above. The matching process may use an iterative closest point algorithm or an algorithm that places meshes around moving data points of the moving object in the position aligned first and second point clouds In embodiments, the system includes a distance module configured to determine a distance moved of a moving object in the position aligned first and second point clouds. The velocity calculation module may be configured to calculate the velocity of the moving object using the distance moved of the moving object and length of time-space between the first and second point clouds. The time space may be defined by a frame rate of the sensor.

In embodiments, the distance moved by the moving object is determined by a difference in position of a first identified cluster of data points representing the moving object in the first position aligned point cloud and a position of a second identified cluster of data points representing the moving object in the second position aligned point cloud. The cluster of data points may be identified as corresponding to the moving object through the matching module described above.

In an embodiment, an autonomous vehicle is provided. The vehicle includes a sensor configured to capture first and second frames of three-dimensional position data of a scene outside of the autonomous vehicle. A data receiving module is configured to generate first and second time-spaced point clouds based respectively on the first and second frames of three-dimensional data. A static scene alignment module is configured to position align a static aspect of the scene in the first point cloud with a static aspect of the scene in the second point cloud to obtain position aligned first and second point clouds. A velocity calculation module is configured to calculate a velocity of a moving object in the position aligned first and second point clouds. An autonomous vehicle control system is configured to control a vehicle feature using the velocity of the moving object.

In embodiments, the vehicle includes a moving and static segmentation module configured to identify moving and static data points. The static scene alignment module may be configured to position align a static aspect of the scene in the first point cloud with a static aspect of the scene in the second point cloud based on the static data points. The vehicle may comprise an object matching module configured to identify a first moving object in the position aligned first point cloud and a second moving object in the position aligned second point cloud that correspond with each other based on the moving data points. The first and second objects may be defined by a cluster of moving data points.

In embodiments, a distance module is configured to determine distance moved between the position aligned first point cloud and the position aligned second point cloud for each moving object. Corresponding moving objects in the position aligned point clouds may be identified by the object matching module described above. The velocity calculation module may be configured to calculate the velocity of each moving object based on the distance moved and a frame rate of the sensor, which defines the time space of the first and second point clouds.

The distance moved may be determined based on a spatial transformation between cluster of moving data points in respective point clouds that correspond with one another. The spatial transformation may be determined using an iterative closest point or by using a mesh matching algorithm. The mesh matching algorithm can include a step of generating a mesh based on a cluster of moving data points in each of the first and second point clouds. The distance moved as described above can be determined based on a distance between the meshes in the position aligned first and second point clouds.

The sensor may be a lidar sensor or other range finding sensor such as radar. The sensor may also be an optical camera.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
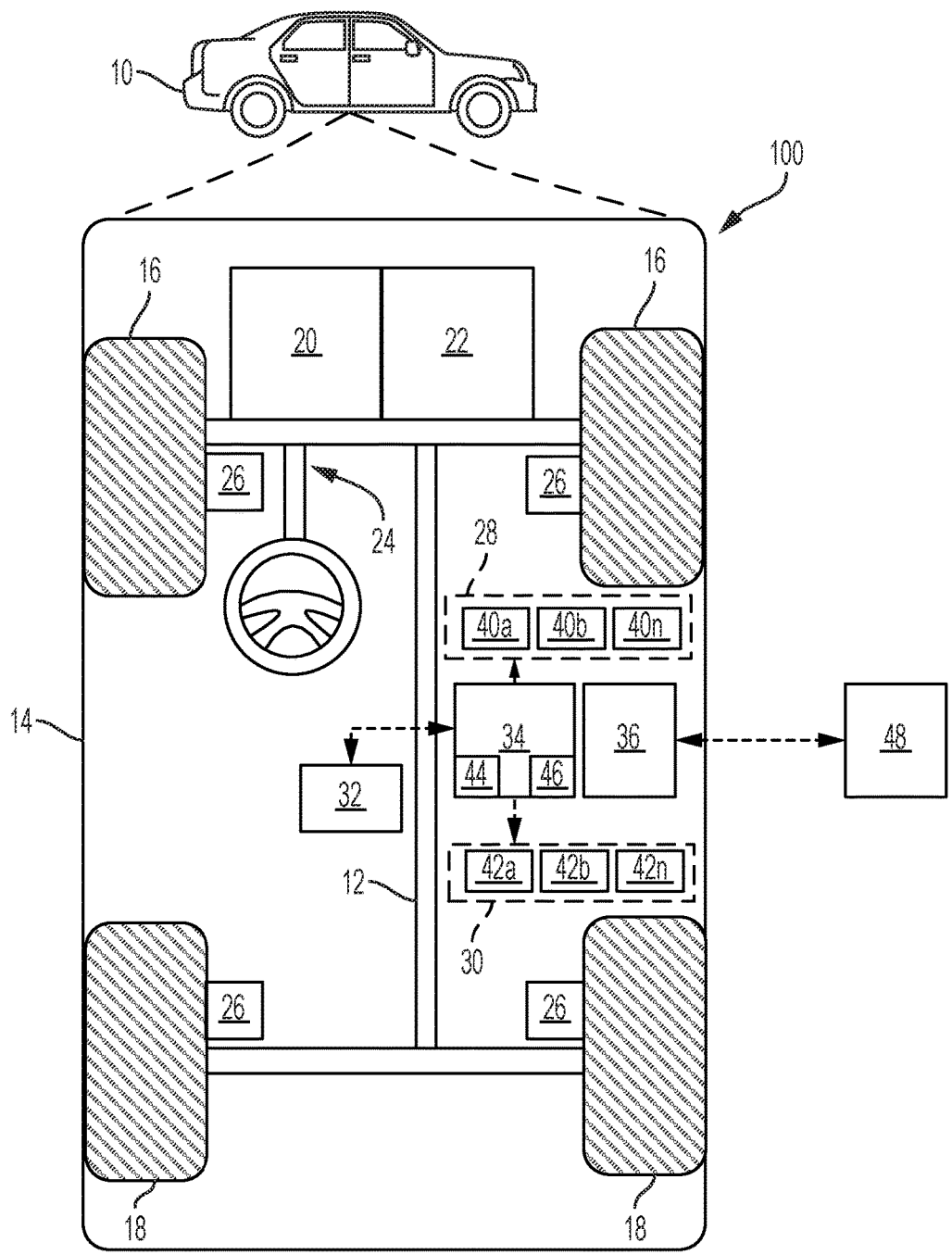
FIG. 1 is a functional block diagram illustrating an autonomous vehicle, in accordance with various embodiments.

With reference to FIG. 1, a system for performing an autonomous vehicle control shown generally as 100 is associated with a vehicle 10 in accordance with various embodiments. In general, the system 100 provides for low level processing of three-dimensional images of surroundings of the vehicle 10, in the form of point clouds, to determine velocity of surrounding objects for use in controlling the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores processing algorithms and data for processing three-dimensional point clouds to determine velocity of objects in the surroundings on a frame by frame basis. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to process three-dimensional imaging data of surroundings of the vehicle 10 in the form of point clouds to determine velocity on a frame by frame basis. The controller 34 is further configured to perform autonomous control functions based on the determined velocity.

Figure 2:
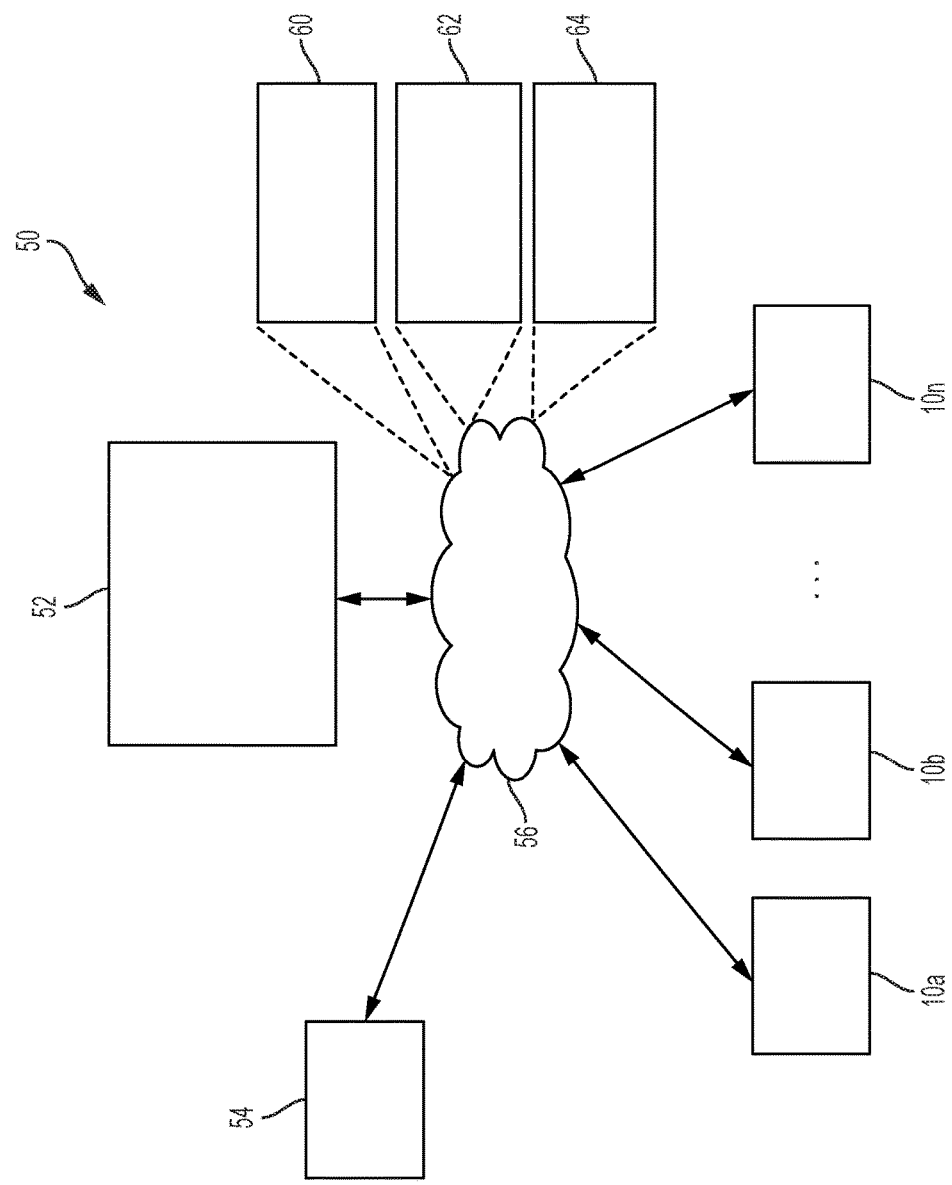
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10*a*-10*n*.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
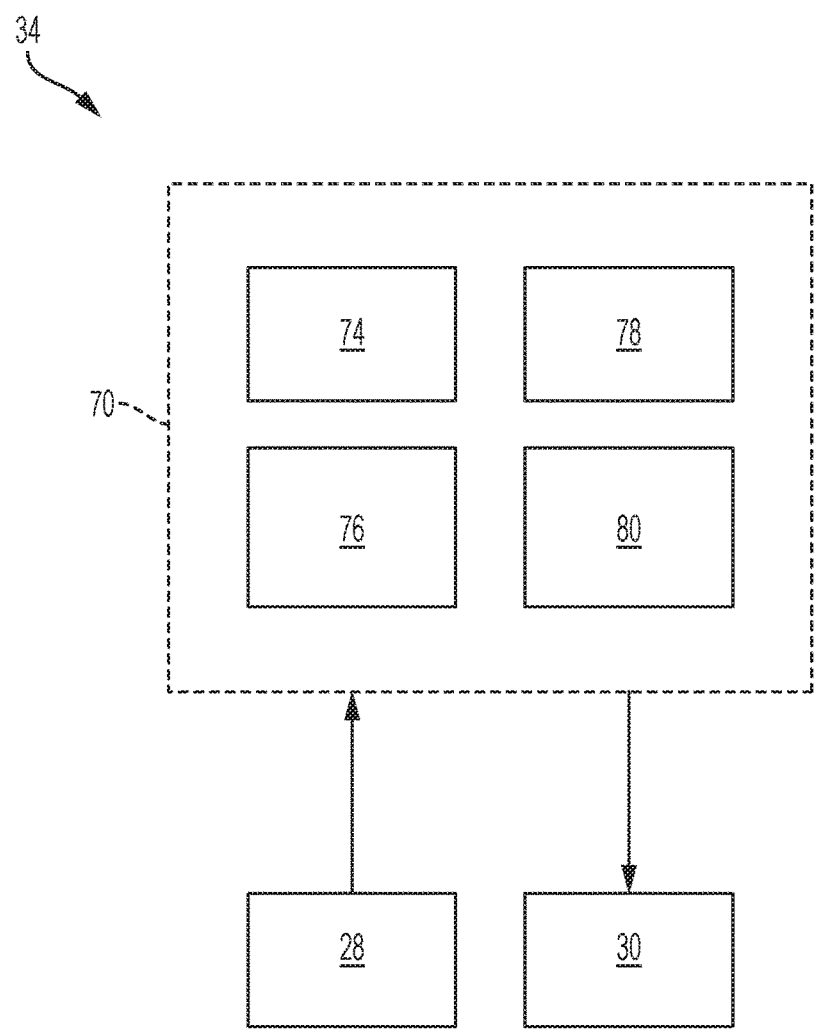
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The autonomous driving system is configured to generate driving outputs, which are communicated to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

As mentioned briefly above, the system 100 of FIG. 1 is included within the autonomous driving system 70, for example, as a system for processing lidar, or other three-dimensional position data, point clouds in order to determine velocity of surrounding objects. The systems and methods for determining velocity described further below with respect to FIGS. 4 and 5 is, in embodiments, incorporated in the positioning system 70 and may be included downstream of the sensor fusion system 74.

Figure 4:
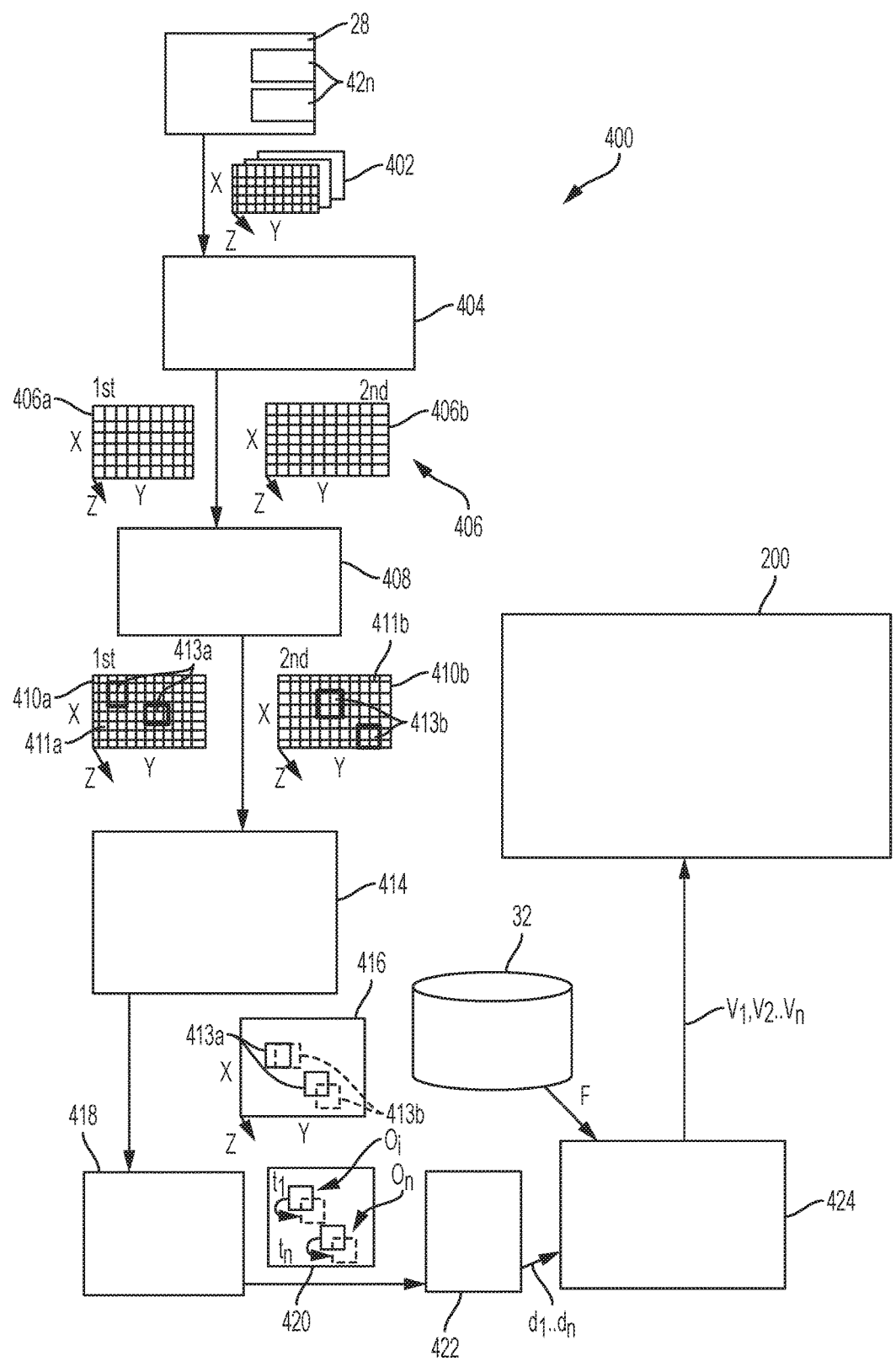
FIG. 4 is a diagram illustrating modules of a point cloud processing system for determining velocity of objects and flow of data between the modules, in accordance with various embodiments.
Figure 5:
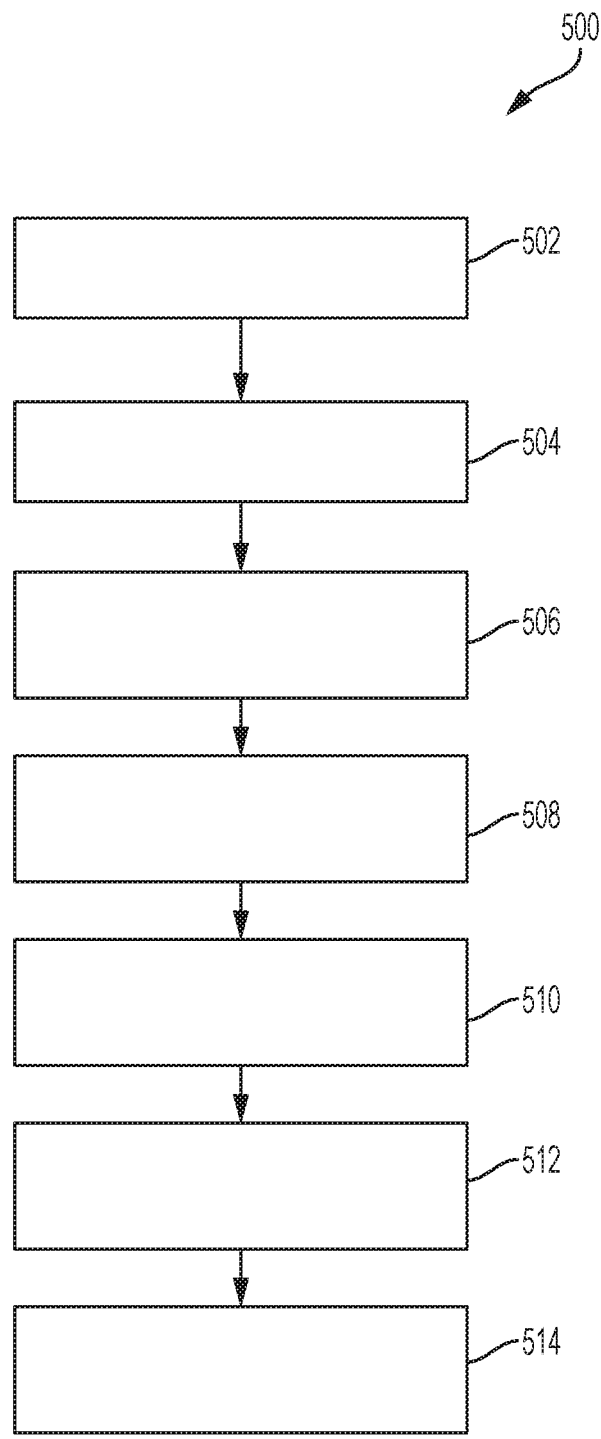
FIG. 5 is a flowchart for a control method for determining velocities of objects based on point cloud data, in accordance with various embodiments.

For example, as shown in more detail with regard to FIG. 4 and with continued reference to FIG. 3, the system 100 includes a point cloud processing system 400. The point cloud processing system 400 of FIG. 4 is, in various embodiments, implemented by at least one processor 44 executing instructions obtained from computer readable medium 46. The point cloud processing system 400 is configured to process frames of point clouds obtained through sensor system 28 in order to determine velocity of surrounding objects for use in the autonomous driving system 70, particularly as part of tracking functions of the positioning system 76 and cross-checking localization of the vehicle 10 as determined by the positioning system 76.

The sensor system 28 obtains three-dimensional imaging data 402 of surroundings of the vehicle 10 through sensor devices 42n. The three-dimensional imaging data 402 may be obtained from a lidar device, radar device or other range finding device 42n or an optical camera. The three-dimensional data 402 may be divided into frames, whereby the sensor device 42n captures time spaced images of each scene surrounding the vehicle 10. The scene surrounding the vehicle 10 include objects (not shown) that can be identified and, through processing methods described herein with reference to FIGS. 4 and 5, velocity of the objects can be determined. The three dimensional imaging data 402 may be obtained through the sensor fusion system 74.

The sensor device 42n generally has a frame rate defining time elapsed between each image capture. For example, in the case of a rotating lidar device 42n, successive frames are captured in successive rotations of the lidar device 42n. The three-dimensional data 402 obtained from the sensor system 28 may be preprocessed by the sensor fusion system 74, which may included as part of a data receiving module 404 in order to generate point cloud data 406. The point cloud data 406 includes an array of points distributed in x and y dimensions that each include range data (and other data fields such as intensity) in the z direction. Although the Cartesian coordinate system is described herein, other three-dimensional coordinate systems could be used such as polar coordinates. Frames of point cloud data 406 will be obtained, each frame being based on frames of the three-dimensional imaging data 402. FIG. 4 shows exemplary first and second frames of point cloud data 406a, 406b that can be used to determine velocity of moving objects in the point cloud data 406. However, it should be understood that one or more recent frames 406a of three-dimensional data can be processed with respect to a plurality of previous frames of point cloud data as at least one second frame of point cloud data 406b.

The point cloud processing system 400 includes a static/moving segmentation module 408 configured to receive the first point cloud and at least one second point clouds 406a, 406b and to segment moving and static data points in the first point cloud 406a. The static/moving segmentation module 408 outputs first and second point clouds 410a, 410b that each include segmented moving data points 413a,b and segmented static data points 411a,b (the second point cloud 410b having been previously segmented). That is, each data point may include an identifier field of either static or moving data. The moving data points 413a,b are separated into clusters of moving data points 413a,b.

The static/moving segmentation module 408 can make use of velocity parameters determined from previous point cloud analysis as described below with respect to velocity calculation module 424. Once velocity parameters are inferred from previous point clouds 406b, they can be grouped (i.e. segmented) to have the same inferred rotational/linear velocities. Static objects will have rotational/translational velocities of close to 0. Accordingly, pervious velocity information can be transposed to a current scene of data points to infer current velocities, thereby allowing static and moving data segmentation.

The point cloud processing system 400 includes a static scene alignment module 414 configured to use the segmented static data points 411a,b to position align the first point cloud 410a with at least one second point cloud 410b, which is/are less recent point clouds. That is, static features, as identified by the static data points 411a,b, in the first point cloud 410a are aligned with corresponding static features in the second point cloud 410b. The static scene alignment module 414 is configured to output position aligned first and second point clouds 416 that have moving data points 413a from the first point cloud 410a relatively shifted as compared to the moving data points 413b from the second point cloud 410b in a common static frame of reference provided by the position aligned first and second point clouds 416. The relatively moving data points 413a, b form clusters of moving data points 413a from the first point cloud 410a that are shifted in position relative to the clusters of moving data points 413b from the second point cloud when viewed in a static frame of reference provided by the position aligned first and second point clouds 416.

The shifted position of the moving data point clusters 413a,b is a three dimensional shift in the x, y and z dimensions and may also encompass rotational movement. A distance moved is defined by the relative shift in position, which can be used to determine a velocity of movement of an object corresponding to each moving cluster of data points 413a,b.

In one possibility, the static scene alignment module 414 is configured to register a static map (which is created beforehand) with more recent point clouds 416. The registration of the point cloud with the static map can use methods such as iterative closest point or other optimization techniques to minimize the difference between the point clouds 416 and the static map. The static map may be made of dense point clouds previously processed and aligned relative to one another (and possibly meshed).

In another possibility, the static scene alignment module 414 is configured to register the point clouds 416 based on visual odometry methods, in which two frames are compared and the difference between them is minimized. Such methods are able to remove error from inertial sensors, as well as to build a high resolution local map The point cloud processing system 400 includes an object matching module 418 configured to match or register corresponding clusters of moving data points 413a, 413b in the position aligned first and second point clouds 416. That is, corresponding clusters of moving points 413a, 413b are identified and a matching or registration is performed to register or match a cluster of moving data points 413a from the first position aligned point cloud with a cluster of moving data points 413b from the second position aligned point cloud.

A number of possibilities exist for identifying matching moving data points 413a, 413b. For example, groupings can be made based on similar rotational/translational velocities. Grouping can be based on similar shapes between recent point clouds 416. Grouping can be based on shapes in a predetermined obstacle set. For example, a member of this obstacle set could be a particular vehicle model which tend to look the same no matter where and when you see them. Another possibility would be grouping based on proximity to a cluster seen in previous point clouds, often with a prediction of where it will be now based on where it was in the past and how it was moving.

The matching or registration processes performed by the object matching module 418 produces a transformation matrix $t_1 \ldots t_n$ for each identified cluster of moving data points $o_1 \ldots o_n$ corresponding to respective moving objects in real space. The object matching module is configured to output a transformation data set 420 based on the matching processes performed by the object matching module 418 that comprises transformation data $t_1 \ldots t_n$ for spatially transforming, with respect to each other, first and second clusters of moving data points $o_1 \ldots o_n$ that have been identified as corresponding.

The matching or registration process comprises, in one embodiment, an iterative closest point algorithm. The iterative closest point algorithm is employed to minimize a positional difference between an identified cluster of moving data points 413a from the first point cloud 410a and an identified cluster of data points 413b from the second point cloud 410b. The positional difference is determined with respect to a static frame of reference as determined through the static scene alignment module 414. In the iterative closest point algorithm, one of the clusters of data points 413a, 413b taken as a reference is kept fixed, while the other cluster of data points 413a, 413b, the source, is transformed to best match the reference. The algorithm iteratively revises the transformation (using a combination of translation and rotation) to minimize the distance from the source to the reference cluster of data points 413a, 413b. The algorithm outputs a refined transformation $t_1 \ldots t_n$ for each identified matching cluster of moving data points 413a, 413b.

In one implementation of the iterative closest point algorithm, an iterative process is performed as follows. For each point in the source point cluster 413a, 413b, the closest point in the reference point cluster 413a, 413b is found. The algorithm then estimates a combination of rotation and translation using a cost function, such as mean squared error, that will best align each source point to its matching reference point. Then, the source points are transformed using the obtained transformation.

The matching or registration process comprises, in various embodiments, a mesh matching algorithm. An exemplary mesh matching algorithm converts the first and second clusters of moving data points 413a,b into search and template polygonal or triangular mesh models representing a topology of the clusters of moving data points 413a,b. Each mesh surface of the template is matched to a search surface and transformation parameters therebetween are determined. In one possibility, a perpendicular distance between the matching template and search surfaces is determined following a normal vector of each surface. A collection of the transformation parameters, e.g. perpendicular distances, constitutes a transformation matrix $t_1 \ldots t_n$.

Transformation data $t_1 \ldots t_n$ is determined for each pair of matching clusters of data points 413a, 413b, which combines to form the transformation data 420 output from the object matching module 418.

The point cloud processing system 400 of FIG. 4 includes a distance module 422 configured to determine a distance moved for each object from the transformation data 420. The transformation data 420 represents a positional relationship between each identified and matched cluster of moving data points 413a, 413b from which a scalar or vector distance parameter $d_1 \ldots d_n$ can be derived by the distance module 422. The distance parameter $d_1 \ldots d_n$ represents a distance moved for each matched cluster of moving data points 413a, 413b.

The point cloud processing system 400 includes a velocity calculation module 424 that is configured to determine velocity $v_1 \ldots v_n$ of each identified moving cluster of data points based on the distance parameters $d_1 \ldots d_n$ representing distance moved. The velocity calculation module may retrieve frame rate data f from data storage device 32 (for example) in order to calculate the velocity $v_1 \ldots v_n$. The frame rate data provides a time elapsed between frames of three-dimensional imaging data 402, which corresponds to time elapsed between first and second point clouds 406a, 406b. The distance parameters $d_1 \ldots d_n$ and the time dimension frame rate f is combined by the velocity calculation module to determine velocity $v_1 \ldots v_n$. The velocity $v_1 \ldots v_n$ can be vector or scalar parameters. The velocity parameters can include rotational and translational velocity components.

The velocity $v_1 \ldots v_n$ parameters for respective clusters of moving data points 413a, 413b output from the velocity calculation module 424 is used by the autonomous driving system 70. The autonomous driving system 70 can use the velocities $v_1 \ldots v_n$ in object tracking as part of the positioning system 76 and/or in localization cross-checking as part of the positioning system 76, for example. In any case, the velocities $v_1 \ldots v_n$ is used by the autonomous driving system 70 to control at least one autonomous vehicle control feature.

Exemplary uses of the velocity parameters by the autonomous driving system 70 include inference of the future motion of identified objects. Such inference may involve use of a Kalman filter that assumed a pre-determined movement model, or a generative model that has been trained on how similar looking obstacles have moved in the past e.g. pedestrians on this crosswalk tend to ignore the light etc. Based on the inferred future motion, the autonomous driving system 70 can generate one or more autonomous driving commands taking into account probable future motion of identified object.

Another exemplary use of the velocity parameters can be removal of error in other systems. For example, an inertial sensor might have noise or other error that makes the autonomous driving system 70 determine an erroneous movement of the vehicle 10, e.g. more or less than in reality. By registering the current point cloud to at least one previous point clouds or a static map made up of previous point clouds, it is possible to inhibit the effects of such error.

The present disclosure proposes methods and system that allow object velocities to be determined from the point cloud data 406, without necessarily requiring object classification and high level processing through, for example, positioning system 70, which generally involves determining and tracking bounding boxes amongst other high level processing operation. The present disclosure allows for processing efficient determining of velocity of objects based on frames of point cloud data 406.

Referring now to FIG. 5, and with continued reference to FIGS. 1-4, a flowchart illustrates a control method 500 that can be performed by the systems 100 of FIG. 1 in accordance with the present disclosure, which includes the autonomous driving system 70 of FIG. 3 and the point cloud processing system 400 of FIG. 5. As can be appreciated in light of the disclosure, the order of operation within the method is not limited to the sequential execution as illustrated in FIG. 5, but may be performed in one or more varying orders as applicable and in accordance with the present disclosure. In various embodiments, the method 400 can be scheduled to run based on one or more predetermined events, and/or can run continuously during operation of the autonomous vehicle 10.

The method 500 includes a step 502 of range sensing a scene surrounding the vehicle 10 and generating point cloud data 406. In particular, the sensor system 28, specifically a range finding sensor 42n thereof, senses three-dimensional images 402 at a frame rate of the sensor 42n. Based on the three-dimensional images 402, first and at least one second frames of three dimensional point cloud data 406a, 406b are generated through the data receiving module and the sensor fusion and preprocessing module 74.

The method 500 includes a step 504 of segmenting the point cloud data, specifically the first, more recent, frame 406a thereof, into static data points 411a,b and moving data points 413a,b. In step 504 clusters of moving data points 413a,b will be defined in each of the frames of point cloud data 406a,b. Step 504 is carried out through the static/moving segmentation module 408 and makes use of a segmentation algorithm as described above to classify the moving and static data points.

The method 500 includes a step 506 of aligning a static scene of the first point cloud 406a with a static scene of at least one second point cloud 406b. The second point cloud 406b may be a static map made up of a plurality of previously registered frames of static point cloud data. In this way, any relative movement of clusters of moving data points 413a,b can be identified in the same frame of reference. The step 506 of aligning static scenes uses the static data points 411a,b of the first and second point clouds 406a,b for position aligning the static scenes. In particular, the alignment step 506 is performed through the static scene alignment module using an alignment algorithm as described above in order to produce position aligned first and second point clouds 416.

The method 500 includes a step 508 of matching clusters of moving data points 413a,b. The movement of a cluster of moving data points 413a in the first point cloud 410a relative to a cluster of moving data points 413b in at least one second point cloud 410b is revealed when the first and second point clouds 410a,b are position aligned in step 506. Clusters of moving data points 413a,b that correspond to the same object in real space are identified in the matching step 508. A registration or matching algorithm is run in step 508 to derive a spatial transformation from a reference cluster of moving data points 413a to a target cluster of moving data points 413b. The registration or matching algorithm may be an iterative closest point algorithm or a mesh matching algorithm in exemplary embodiments. The matching step 508 is carried out through the object matching module 418 and produces transformation data 420.

The method 500 includes a step 510 of determining distance moved $d_1 \ldots d_n$ of each cluster identified as being corresponding in step 508. In particular, the transformation data 420 provides a spatial relationship between clusters of moving data points 413a,413b that have moved in the position aligned static scenes 416 constituting a static frame of reference. Such a spatial relationship allows a distance parameter $d_1 \ldots d_n$ to be derived in scalar or vector form. The step 510 of determining distance moved $d_1 \ldots d_n$ is carried out through the distance module 422.

The method 500 includes a step 512 of calculating velocity $v_1 \ldots v_n$ of each cluster of moving data points 413a,b, which corresponds to a velocity of an object in real space. Based on the distance parameter $d_1 \ldots d_n$ and the frame rate f of the sensor device 42n, velocity $v_1 \ldots v_n$ can be derived. The velocity calculation of step 512 is performed through the velocity calculation module 424.

The method 500 includes a step 514 of using the calculated velocity $v_1 \ldots v_n$ from step 512 as an input for the autonomous driving system 70 for generating at least one control function for the vehicle 10. In particular, the calculated velocity $v_1 \ldots v_n$ can be used in tracking control and/or localization control as described above.

In the foregoing, first and second time spaced point clouds are described with respect to static/moving data segmentation, static alignment, and object matching processes. It is envisaged that these steps can be performed based on one or more recent point clouds with more than one previous point cloud. For example, a static map of combined and aligned previous point clouds could be generated and used as a reference for comparison with one or more recent point clouds.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an autonomous vehicle, the method comprising:
    obtaining a first point cloud and at least one second point cloud that are time spaced based on three-dimensional position data, of a scene outside of the autonomous vehicle, from at least one sensor of the autonomous vehicle;
    position aligning, via at least one processor, at least one static aspect of the scene in the first point cloud with at least one static aspect of the scene in the at least one second point cloud to obtain position aligned first and second point clouds;
    generating a sparse mesh around data points in the first and second point clouds corresponding to the moving object;
    determining a distance moved between the sparse mesh in the first second position aligned point cloud;
    determining, via at least one processor, a velocity of at least one moving object in the position aligned first and second point clouds based on the distance moved; and
    performing, via at least one processor, an autonomous vehicle control function using the velocity of the at least one moving object.

2. The method of claim 1, wherein the determining step comprises determining a distance moved for the at least one moving object between the position aligned first and second point clouds, and wherein the velocity of the at least one moving object is determined based on the distance moved.

3. The method of claim 1, wherein the determining step comprises using an elapsed time between the first and second time spaced point clouds to determine the velocity.

4. The method of claim 1, comprising identifying at least one cluster of data points in the first and second time spaced point clouds corresponding to the at least one moving object.

5. The method of claim 4, comprising matching at least one cluster of data points in the point cloud with at least one cluster of data points in the at least one second point cloud, wherein the determining step comprises determining velocity of the at least one moving object based on a distance moved between matched clusters of data points in the position aligned first and second point clouds.

6. The method of claim 5, wherein the matching comprises an iterative closest point or mesh matching algorithm.

7. The method of claim 1, comprising segmenting the first and second point clouds into moving and static data points, wherein the position aligning step uses the static data points as the at least one static aspect.

8. The method of claim 7, wherein the determining step uses the moving data points in the position aligned first and second point clouds to determine the velocity of the at least one moving object.

9. The method of claim 1, wherein the determining step comprises an iterative closest point calculation to determine a distance moved for the at least one moving object, wherein the velocity of the at least one moving object is determined based on the distance moved.

10. The method of claim 1, wherein the first and second point clouds correspond to successive frames of the at least one sensor capturing the scene.

11. The method of claim 1, wherein the obtaining, position aligning and determining steps are carried out for each set of successive frames of the scene captured by the at least one sensor.

12. The method of claim 1, wherein the at least one sensor is a lidar sensor, a radar sensor or an optical camera.

13. A system for controlling an autonomous vehicle, the system comprising:
a data receiving module configured to receive a first point cloud and at least one second point cloud that are time spaced point clouds based on three-dimensional position data, of a scene outside of the autonomous vehicle, from at least one sensor of the autonomous vehicle;
a static scene alignment module configured to, via a processor, position align at least one static aspect of the scene in the first point cloud with at least one static aspect of the scene in the at least one second point cloud to obtain position aligned first and second point clouds;
a distance module configured to, via a processor, generate a sparse mesh around data points in the first and second point clouds corresponding to the moving object and determine a distance moved between the sparse mesh in the first second position aligned point cloud;
a velocity calculation module configured to, via a processor, calculate a velocity of at least one moving object in the position aligned first and second point clouds based on the distance moved; and
an autonomous vehicle control system configured to, via a processor, control at least one feature of the autonomous vehicle using the velocity of the at least one moving object.

14. The system of claim 13, comprising a static and moving segmentation module configured to, via a processor, identify static and moving data points, wherein the static scene alignment module is configured to position align static aspects of the first and second point clouds based on the static data points.

15. The system of claim 13, comprising an object matching module configured to, via a processor, match at least one moving object in the first point cloud with at least one moving object in the at least one second point cloud, wherein the velocity calculation module is configured to calculate the velocity of the at least one moving object based on the matched at least one moving object in the position aligned first and second point clouds.

16. An autonomous vehicle comprising:
at least one sensor configured to capture a first frame of three-dimensional data and at least one second frame of three-dimensional position data of a scene outside of the autonomous vehicle;
a data receiving module configured to generate a first point cloud and at least one second point cloud that are time-spaced point clouds based respectively on the first frame of three-dimensional data and the at least one second frame of three-dimensional data;
a static scene alignment module configured to, via a processor, position align at least one static aspect of the scene in the first point cloud with at least one static aspect of the scene in the at least one second point cloud to obtain position aligned first and second point clouds;
a distance module configured to, via a processor, generate a sparse mesh around data points in the first and second point clouds corresponding to the moving object and determine a distance moved between the sparse mesh in the first second position aligned point cloud;
a velocity calculation module configured to, via a processor, calculate a velocity of at least one moving object in the position aligned first and second point clouds based on the distance moved; and
an autonomous vehicle control system configured to, via a processor, control at least one feature of the autonomous vehicle using the velocity of the at least one moving object.

17. The vehicle of claim 16, wherein the at least one sensor comprises at least one of a lidar sensor, a radar sensor, and an optical camera.

18. The vehicle of claim 16, comprising a moving and static segmentation module configured to, via a processor, identify moving and static data points, wherein the static scene alignment module is configured to position align at least one static aspect of the scene in the first point cloud with at least one static aspect of the scene in the second point cloud based on the static data points, an object matching module configured to, via a processor, match at least one moving object in the position aligned first and second point clouds based on the moving data points, and wherein the velocity calculation module is configured to calculate the velocity of each of the at least one moving object based on the distance moved and frame rate of the at least one sensor defining the time space of the first and second point clouds.

* * * * *